US012675091B2

(12) United States Patent
Horikawa et al.

(10) Patent No.: US 12,675,091 B2
(45) Date of Patent: Jul. 7, 2026

(54) COMPUTER USED FOR A MACHINE TOOL

(71) Applicant: FANUC CORPORATION, Yamanashi (JP)

(72) Inventors: Yuutarou Horikawa, Yamanashi (JP); Masashi Yasuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 322 days.

(21) Appl. No.: 18/256,874

(22) PCT Filed: Feb. 22, 2022

(86) PCT No.: PCT/JP2022/007183
§ 371 (c)(1),
(2) Date: Jun. 9, 2023

(87) PCT Pub. No.: WO2022/181594
PCT Pub. Date: Sep. 1, 2022

(65) Prior Publication Data
US 2024/0019837 A1    Jan. 18, 2024

(30) Foreign Application Priority Data
Feb. 26, 2021    (JP) ................................. 2021-030527

(51) Int. Cl.
*G05B 19/4063*    (2006.01)
*G05B 19/4155*    (2006.01)
(52) U.S. Cl.
CPC ..... *G05B 19/4063* (2013.01); *G05B 19/4155* (2013.01); *G05B 2219/35349* (2013.01); *G05B 2219/35402* (2013.01)

(58) Field of Classification Search
None
See application file for complete search history.

(56) References Cited

U.S. PATENT DOCUMENTS

2017/0075337 A1 *    3/2017    Kameta ................ G05B 19/402
2017/0270434 A1 *    9/2017    Takigawa ............... B23K 26/38
(Continued)

FOREIGN PATENT DOCUMENTS

JP        H07227720 A    *    8/1995
JP        2017-056515 A        3/2017
(Continued)

OTHER PUBLICATIONS

International Search Report issued in PCT/JP2022/007183; mailed May 10, 2022.

*Primary Examiner* — David Earl Ogg
(74) *Attorney, Agent, or Firm* — Studebaker Brackett PLLC

(57) ABSTRACT

The present invention addresses the problem of providing a computer for a machine tool that can easily be configured without repeated trial-and-error to allow a user to select optimal machining conditions. Provided is a computer for a machine tool machining a workpiece by oscillating a cutting tool and the workpiece relative to each other, wherein by means of a machining program, oscillation conditions and machining conditions including the oscillation conditions are acquired, a machining state is calculated as numerical parameters from the acquired machining conditions and oscillation conditions, and on the basis of the calculated result, the machining state is reflected in a selected block of the machining program, whereby the above problem can be solved.

13 Claims, 10 Drawing Sheets

(56)        References Cited

U.S. PATENT DOCUMENTS

| 2018/0281090 | A1* | 10/2018 | Watanabe | G05B 19/4093 |
| 2019/0310815 | A1* | 10/2019 | Oho | G06F 3/14 |
| 2019/0324425 | A1* | 10/2019 | Oho | G05B 19/4068 |
| 2019/0391558 | A1* | 12/2019 | Kawai | G05B 19/404 |
| 2020/0094327 | A1* | 3/2020 | Muramatsu | G05B 19/40937 |

FOREIGN PATENT DOCUMENTS

| JP | 6546707 | B2 | 7/2019 |
| JP | 2019-185260 | A | 10/2019 |
| JP | 2020-037375 | A | 3/2020 |

* cited by examiner

FIG. 5

EACH PARAMETER OF MACHINING CONDITION USED IN EACH UNIT OF MACHINING STATE CALCULATION UNIT

| EACH UNIT OF MACHINING STATE CALCULATION UNIT \ EACH PARAMETER | OSCILLATION FREQUENCY MULTIPLYING FACTOR I | OSCILLATION AMPLITUDE MULTIPLYING FACTOR K | ROTATION NUMBER S ABOUT MAIN AXIS | FEEDING AMOUNT F PER ROTATION | BLADE EDGE RADIUS R | WORKPIECE DIAMETER |
|---|---|---|---|---|---|---|
| CHIP SHREDDING DETERMINATION UNIT 31 | ○ | ○ | | | | |
| CHIP LENGTH CALCULATION UNIT 32 | ○ | | | | | ○ |
| SURFACE ROUGHNESS CALCULATION UNIT 33 | ○ | ○ | | ○ | ○ | |
| OSCILLATION FREQUENCY CALCULATION UNIT 34 | ○ | | ○ | | | |
| OSCILLATION AMPLITUDE CALCULATION UNIT 35 | | ○ | | ○ | | |
| MAXIMUM SPEED CALCULATION UNIT 36 | ○ | ○ | ○ | ○ | | |
| MAXIMUM ACCELERATION CALCULATION UNIT 37 | ○ | ○ | ○ | ○ | | |

COMPUTER USED FOR A MACHINE TOOL

TECHNICAL FIELD

The present invention relates to a computer used for a machine tool, and particularly relates to a computer that calculates a machining state from a machining condition.

BACKGROUND ART

Conventionally, in order for a user to easily set a machining condition, information on various parameters relating to the machining condition are visually displayed in a machine tool.

Patent Document 1 describes that for the purpose of visually easily determining, by a worker, the availability of chip shredding by oscillation cutting for a machine tool that performs oscillation cutting, when feed axis path information is acquired and displayed, part of the path information is selected and a selected path including the selected part and at least one of adjacent paths before and after the selected paths are highlighted relative to other paths.

Patent Document 2 describes that in order for a user to set a vibration condition according to an input value of the number of relative rotations or vibrations of a cutting tool and a workpiece in a machine tool, an input unit that receives the input number of relative rotations or vibrations of the cutting tool and the workpiece, a selection unit that selectably displays combinations of parameters obtained from the input number of rotations or vibrations, and a setting unit that sets each selected parameter to a control unit are provided.

Patent Document 1: Japanese Unexamined Patent Application, Publication No. 2019-185260
Patent Document 2: Japanese Patent No. 6546707

DISCLOSURE OF THE INVENTION

Problems to be Solved by the Invention

As described above, a technique of displaying, for the purpose of easily setting the optimal machining condition parameters in the machine tool by the user, the machining state of the machine tool according to the parameters set by the user has been known. However, in any of Patent Documents 1 and 2, the user needs to input each parameter many times through trial and error in order to select the optimal machining condition from the displayed machining state and parameters of the machine tool. It is not easy to select/set the machining condition, and it involves a great amount of time and effort.

There has been a demand for easily setting the machining condition by the user in order to improve the machining efficiency of the machine tool. The present disclosure is intended to easily select and set, by a user, an optimal machining condition without repeating a trial-and-error process.

Means for Solving the Problems

In order to solve the above-described problems, a computer of the present disclosure is a computer for a machine tool that machines a workpiece while oscillating a cutting tool and the workpiece relative to each other based on a machining program, the computer including a machining condition acquisition unit that acquires a machining condition and an oscillation condition, a machining state calculation unit that calculates a machining state from the machining and oscillation conditions acquired by the machining condition acquisition unit, a display unit that displays the machining and oscillation conditions acquired by the machining condition acquisition unit and the machining state calculated by the machining state calculation unit, and a machining condition reflection unit that reflects the machining and oscillation conditions acquired by the machining condition acquisition unit on the machining program.

Effects of the Invention

According to the computer of the present invention, the newly-acquired machining and oscillation conditions are reflected on the machining program of the computer based on the machining state results calculated from the acquired machining and oscillation conditions, and therefore, the user can easily effortlessly select and set the machining and oscillation conditions without the need for inputting each parameter many times through trial and error to select the optimal conditions.

BRIEF DESCRIPTION OF THE DRAWINGS

FIG. 5 is a table showing numerical parameters used in each calculation unit of the machining state calculation unit of the present disclosure.

PREFERRED MODE FOR CARRYING OUT THE INVENTION

Hereinafter, an embodiment of the present invention will be described in detail with reference to the drawings.

Figure 1:
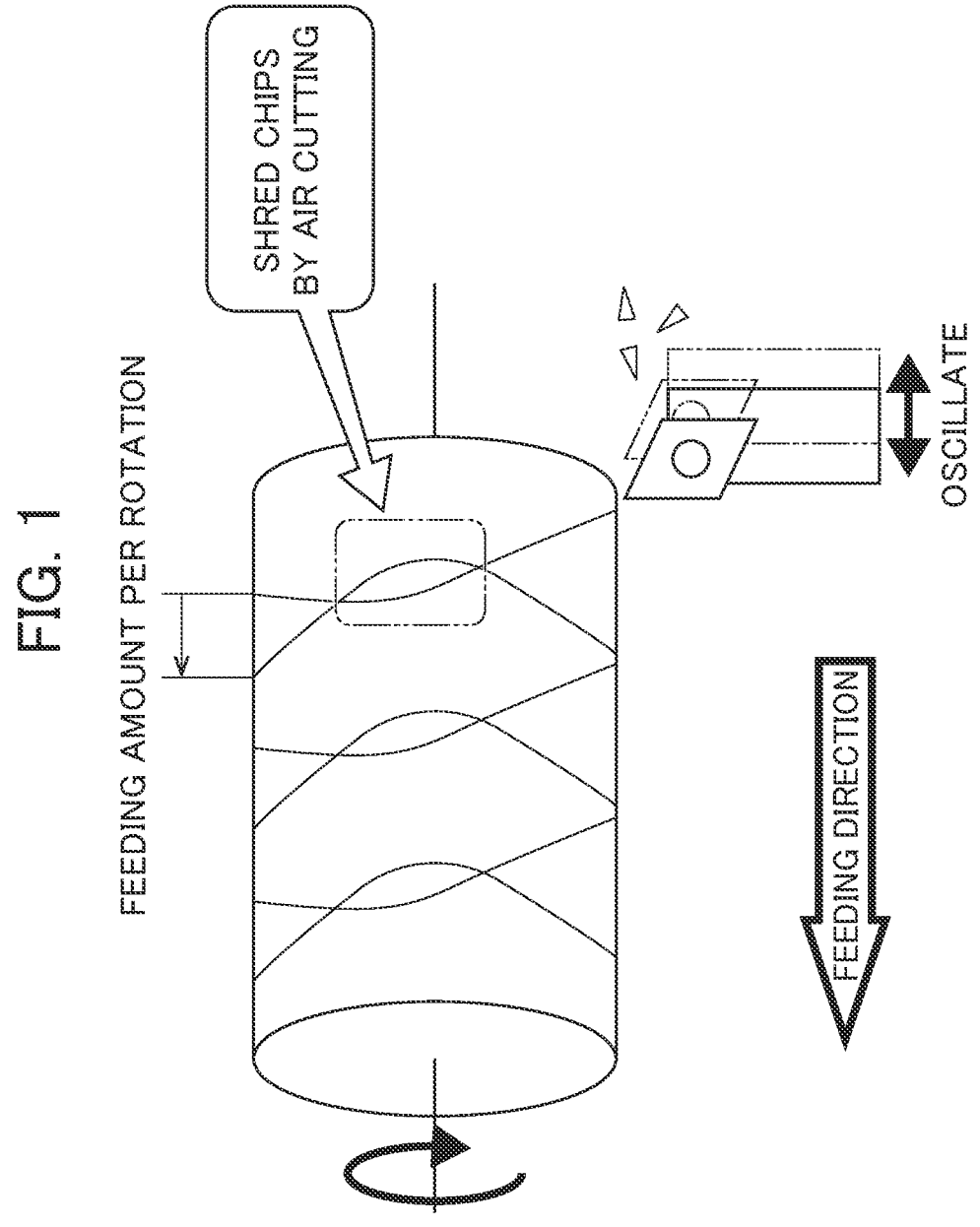
FIG. 1 is a view for describing oscillation cutting.

First, oscillation cutting be described. There has been a technique called oscillation cutting. In oscillation cutting, a cutting tool is oscillated in a feeding direction to shred chips caused due to workpiece machining when a workpiece is machined in such a manner that the workpiece is fed in the feeding direction with the cutting tool contacting a workpiece surface while the workpiece is rotating about a main axis, as shown in FIG. 1. By oscillation cutting, an overlap of cutting in previous rotation and cutting in current rotation is formed in every rotation about the main axis, and at such an overlap, air cutting in which the cutting tool does not contact the workpiece is made. By such air cutting, the chips are shredded so that a failure due to, e.g., covering of the cutting tool with the chips can be avoided.

Figure 2:
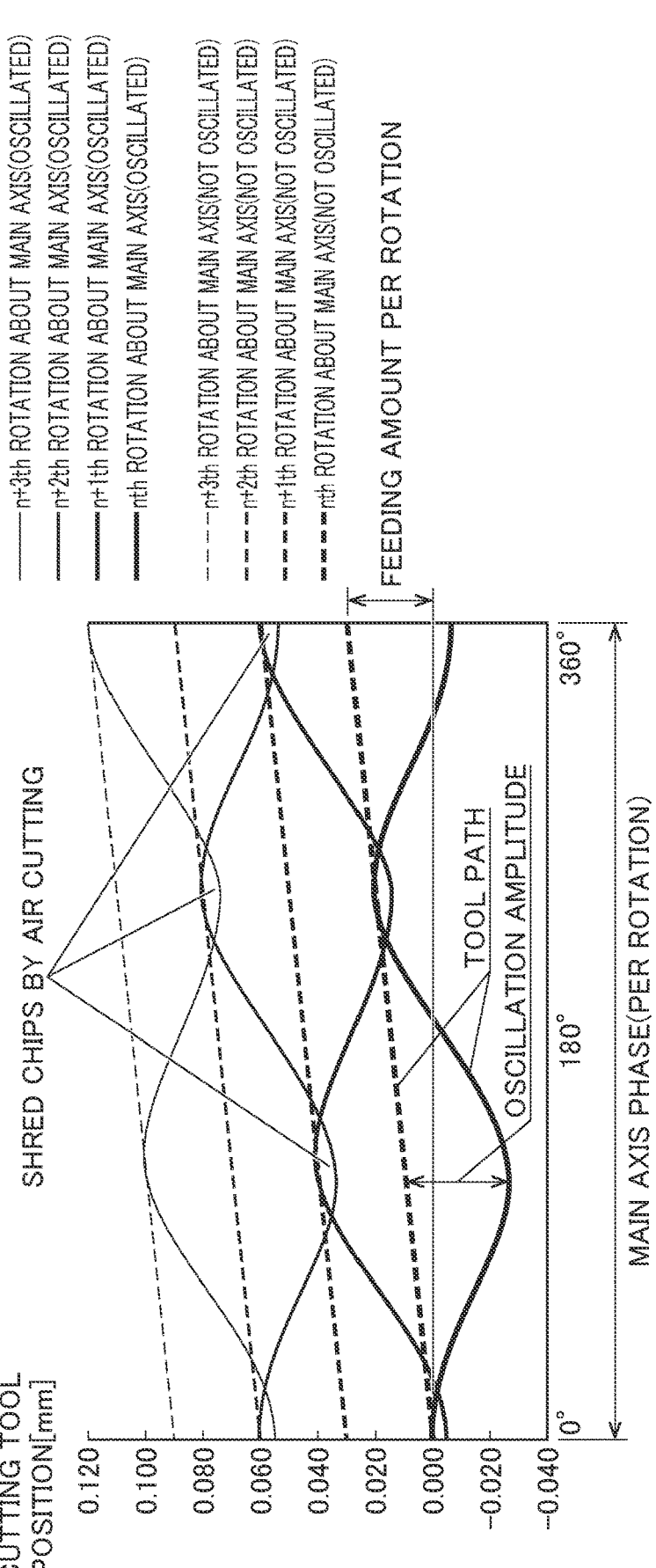
FIG. 2 is a graph of the path of a cutting tool on a surface in oscillation cutting.

FIG. 2 shows a graph of the path of the cutting tool on the surface in the above-described oscillation cutting. In this graph, a straight line indicates movement of the point of contact between the cutting tool and the workpiece in a case where the cutting tool is not oscillated, and a corrugated line indicates movement of the point of contact between the cutting tool and the workpiece in a case where the cutting tool is oscillated in the feeding direction. At an overlap of two curved lines, i.e., an overlap of the path of the cutting tool in previous rotation and the path of the cutting tool in current rotation, air cutting is made to shred the chips. From the graph of FIG. 2 obtained in such a manner that an oscillation condition is set/changed, it can be checked whether or not there is an intersection between the previous path and the current path, i.e., the chips are shredded. Conventionally, a trial-and-error process is required for setting the tool path such that the chips are shredded.

Figure 3:
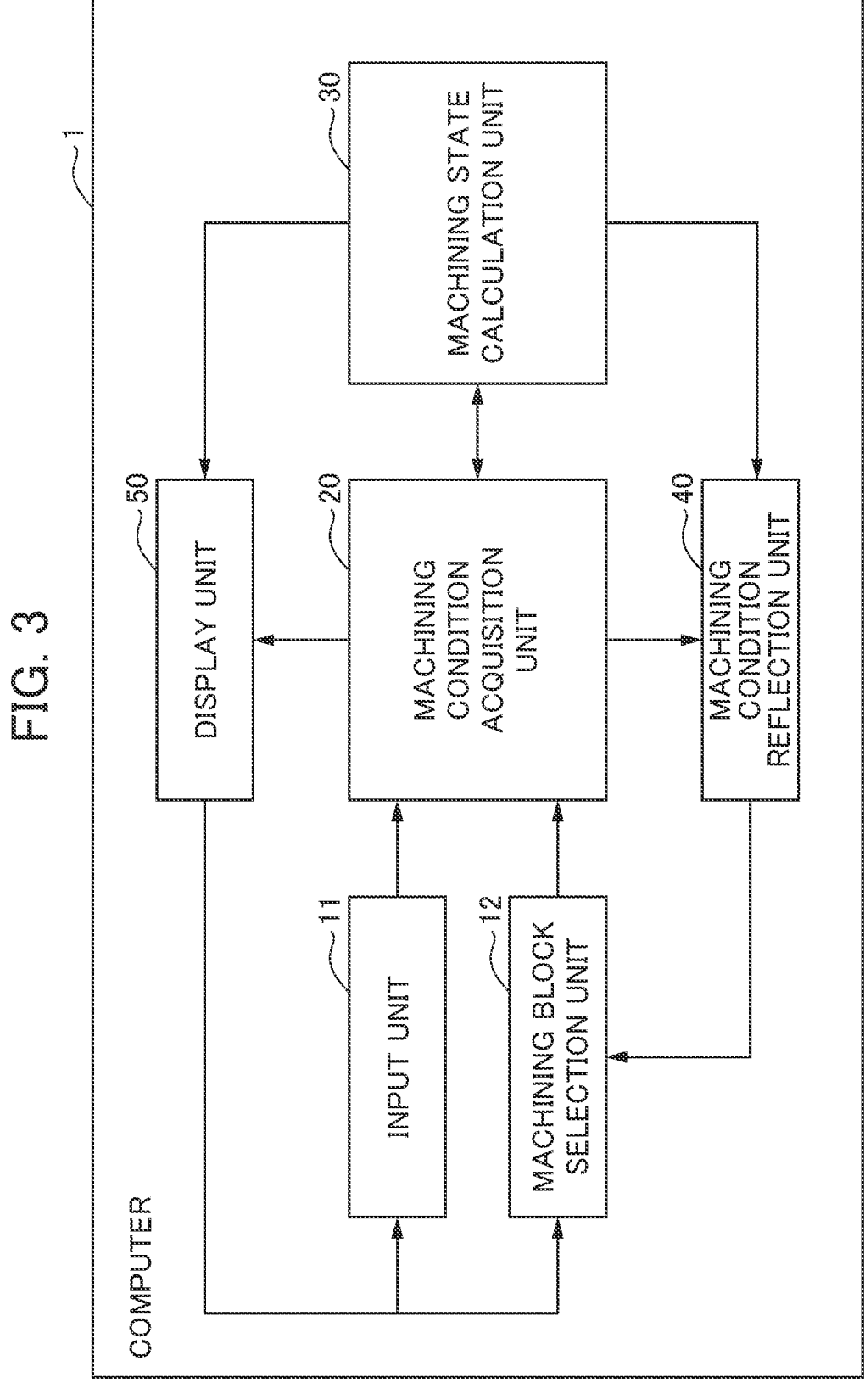
FIG. 3 is a control block diagram of a computer for a machine tool according to the present disclosure.

FIG. 3 is a block diagram of a computer for a machine tool according to one embodiment of the present disclosure. As shown in FIG. 3, the computer 1 for the machine tool according to the present disclosure includes an input unit 11, a machining block selection unit 12, a machining condition acquisition unit 20, a machining state calculation unit 30, a machining condition reflection unit 40, and a display unit 50.

A user can input relevant information for extracting a machining condition and the oscillation condition to the input unit 11, and can select, using the machining block selection unit 12, an intended program block from a machining program for the machine tool. Note that the block selected by the machining block selection unit 12 includes the block selected by the user as described above and a block determining the machining and oscillation conditions relating to the block selected by the user. The information input to the input unit 11 and the information on the program block selected by the machining block selection unit 12 are output to the machining condition acquisition unit 20, and the machining condition acquisition unit 20 receives such information.

In the machining condition acquisition unit 20, the machining and oscillation conditions are extracted and acquired from the information received from the input unit 11 and the machining block selection unit 12. The machining and oscillation conditions acquired by the machining condition acquisition unit 20 include, for example, information from which an oscillation frequency is uniquely obtained, information from which an oscillation amplitude is uniquely obtained, and information such as a tool feeding speed (mm/min), a workpiece diameter (mm), a blade edge radius R (mm), and a tool clearance angle (°). The information from which the oscillation frequency is uniquely obtained includes an oscillation frequency multiplying factor (multiplying number) I indicating an oscillation frequency, per rotation about the main axis, and the information from which the oscillation amplitude is uniquely obtained includes an oscillation amplitude multiplying factor (multiplying number) K indicating the magnitude of oscillation amplitude with respect to a feeding amount per rotation about the main axis. The tool feeding speed is obtained from a rotation number S (1/min) about the main axis and a feeding amount F (mm/rev) per rotation. The information such as the above-described parameters relating to the machining and oscillation conditions extracted and acquired by the machining condition acquisition unit 20 is transmitted to the machining state calculation unit 30, the machining condition reflection unit and the display unit 50.

Figure 4:
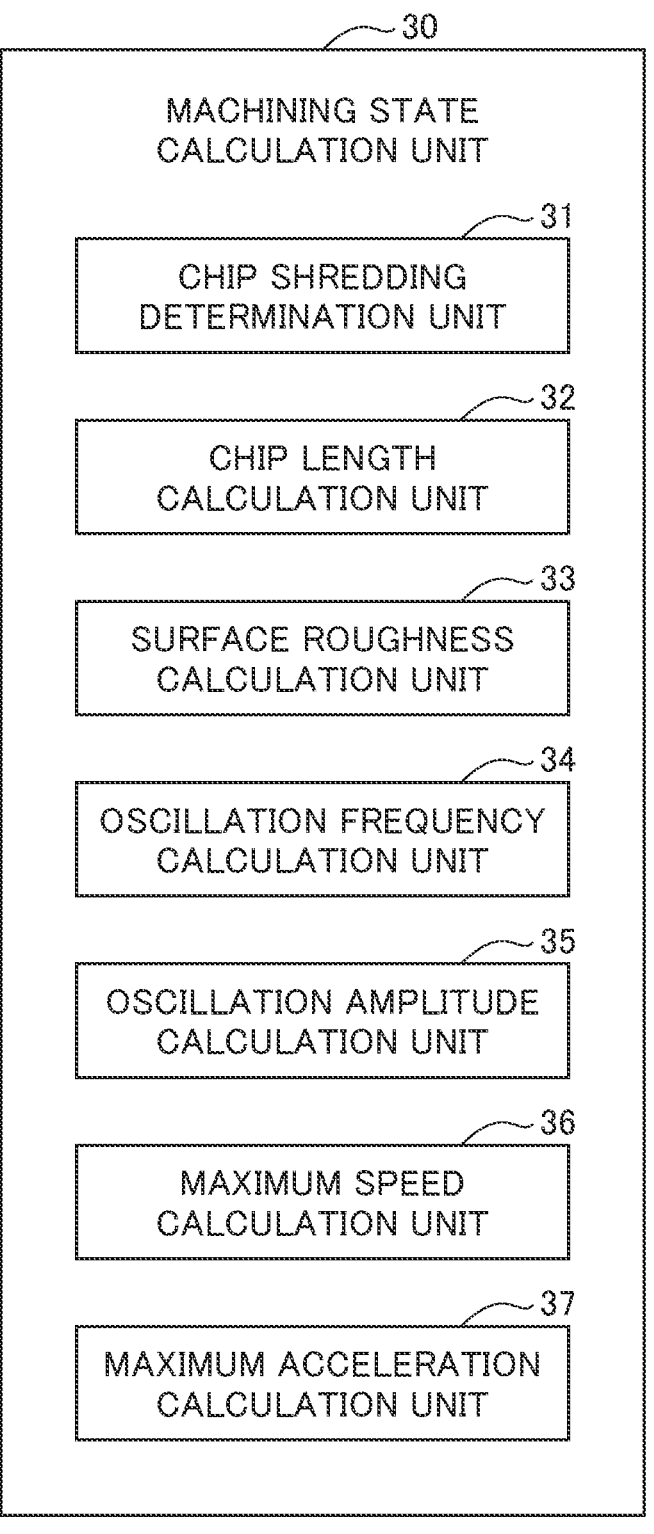
FIG. 4 is a diagram showing each calculation unit in a machining state calculation unit of the computer of the present disclosure.

As shown in FIG. 4, the machining state calculation unit includes a chip shredding determination unit 31, a chip length calculation unit 32, a surface roughness calculation unit 33, an oscillation frequency calculation unit 34, an oscillation amplitude calculation unit 35, a maximum speed calculation unit 36, and a maximum acceleration calculation unit 37.

The chip shredding determination unit 31 determines the availability of chip shredding from the oscillation frequency multiplying factor I and the oscillation amplitude multiplying factor K. The chip length calculation unit 32 calculates a chip length from the oscillation frequency multiplying factor I and the workpiece diameter. The surface roughness calculation unit 33 calculates a surface roughness from the oscillation frequency multiplying factor I, the oscillation amplitude multiplying factor K, the feeding amount F per rotation, and the blade edge radius P. The oscillation frequency calculation unit 34 calculates the oscillation frequency from the oscillation frequency multiplying factor I and the rotation number S about the main axis. The oscillation amplitude calculation unit 35 calculates the oscillation amplitude from the oscillation amplitude multiplying factor K and the feeding amount F per rotation. The maximum speed calculation unit 36 calculates the maximum speed from the oscillation frequency multiplying factor I, the oscillation amplitude multiplying factor K, the rotation number S about the main axis, and the feeding amount F per rotation. The maximum acceleration calculation unit 37 calculates the maximum acceleration from the oscillation frequency multiplying factor I, the oscillation amplitude multiplying factor K, the rotation number S about the main axis, and the feeding amount F per rotation.

The chip shredding availability information which is the information calculated/determined by the chip shredding determination unit 31 is transmitted to the machining condition reflection unit 40, and is also transmitted to the display unit 50. Moreover, the numerical data such as the chip length, the surface roughness, the oscillation frequency, the oscillation amplitude, the maximum speed, and the maximum acceleration is transmitted to the display unit 50. In a case where the chip shredding availability information displayed on the display unit 50 indicates "unavailable", i.e., the chips are not properly shredded, the user can newly input the relevant information for extracting the machining and oscillation conditions to the input unit 11. The information newly input to the input unit 11 is transmitted to the machining condition acquisition unit, and accordingly, the machining and oscillation conditions are newly acquired. The machining condition reflection unit 40 reflects the machining and oscillation conditions newly acquired by the machining condition acquisition unit 20 on the machining program block selected by the machining block selection unit. Even in a case where the chip shredding availability information displayed on the display unit 50 indicates "available", the user may newly input, with reference to each result (the chip length, the maximum speed, etc.) obtained by the machining state calculation unit, the relevant information for extracting the machining and oscillation conditions to the input unit 11, and these conditions may be reflected on the machining program block selected by the machining block selection unit. Alternatively, the oscillation condition where the values obtained by any one or more units selected from the machining state calculation unit 30 are minimized may be obtained by back calculation, and may be reflected on the machining condition acquisition unit 20. The oscillation condition where the values are minimized is calculated from a relational expression among the units selected from the machining state calculation unit 30 and the machining/oscillation condition. In this case, the oscillation condition where chip shredding is determined as available from an expression for determining the availability of chip shredding and the values obtained by the units selected from the machining state calculation unit 30 are the minimum values may be calculated.

On the display unit 50, each parameter relating to the above-described machining and oscillation conditions acquired by the machining condition acquisition unit 20 and data on the results of the machining state calculated by the machining state calculation unit 30 are displayed. Displaying of the data on the results of the machining state also includes graphic displaying of oscillation motion. Moreover, on the display unit 50, the user can input each parameter relating to the machining and oscillation conditions, and these values are taken as the input to the input unit 11. In addition, the user can specify the block from the machining program displayed on the display unit 50, and such a specified program block is taken as the block selected using the machining block selection unit 12 by the user.

FIG. 5 summarizes a relationship among the parameters of the machining and oscillation conditions including the oscillation frequency multiplying factor I, the oscillation amplitude multiplying factor K, the rotation number S about the main axis, the feeding amount F per rotation, the workpiece diameter φ, and the blade edge radius R, the parameters being used by each of the chip shredding determination unit 31, the chip length calculation unit 32, the surface roughness calculation unit 33, the oscillation frequency calculation unit 34, the oscillation amplitude calculation unit 35, the maximum speed calculation unit 36, and the maximum acceleration calculation unit 37 of the machining state calculation unit 30. Note that in addition to the above-described parameters, the parameters of the machining and oscillation conditions also include information on the clearance angle (°) and taper angle (°) of the tool, etc.

As a method for acquiring each of the above-described parameters, the oscillation frequency multiplying factor I, the oscillation amplitude multiplying factor K, the feeding amount F per rotation, and the rotation number S about the main axis are acquired from modal information. The modal information is unchanged information with a constant value after the user has set the information once as long as the user does not newly set the information again. The blade edge radius R and the clearance angle are acquired from modal tool information (T-number). The workpiece diameter can be acquired from the X-coordinate of the selected machining program block, and the taper angle can be acquired from the start and end points of the XZ-coordinates of the selected machining program block.

Figure 6:
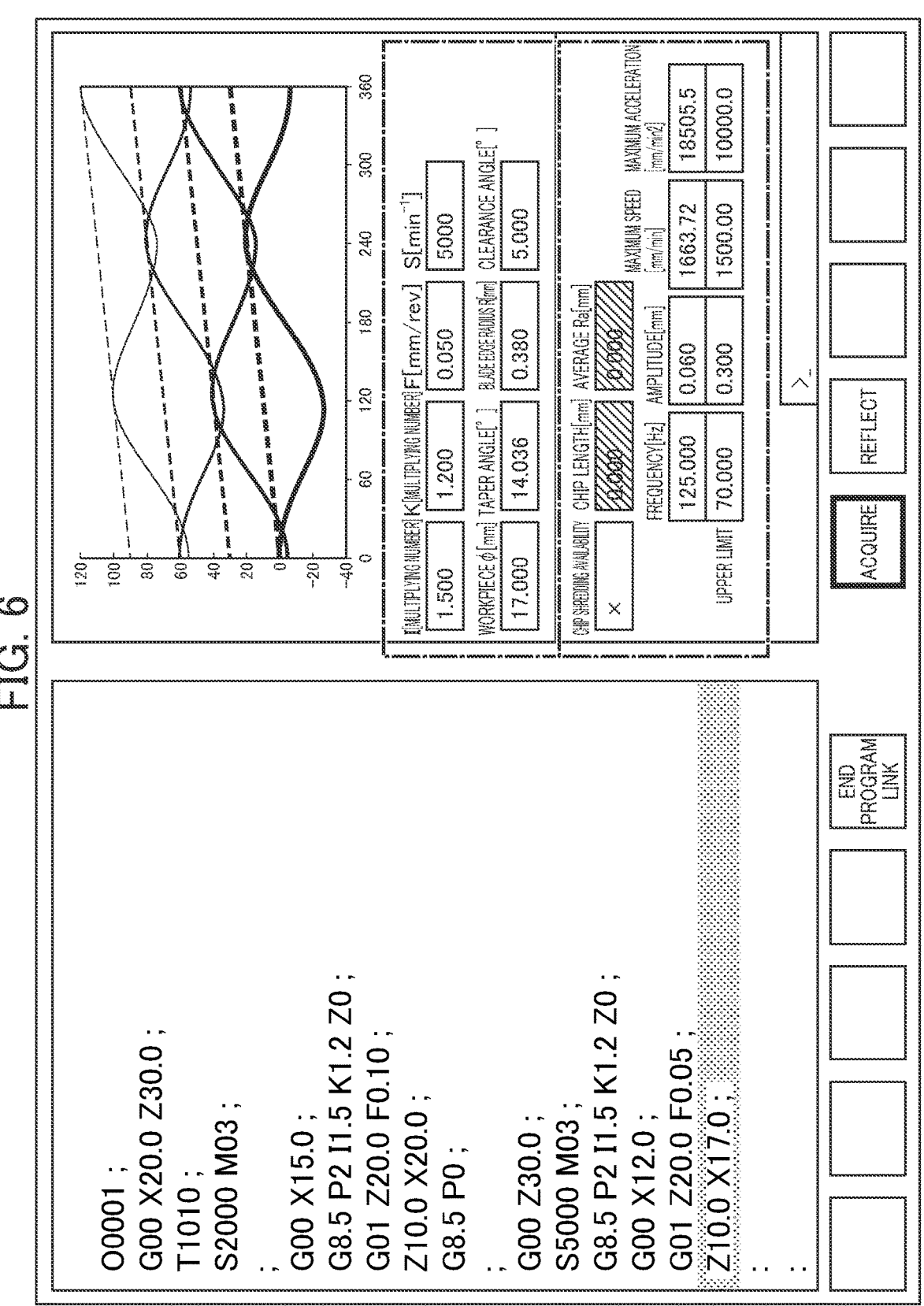
FIG. 6 is a view showing a display example of a display unit of the computer of the present disclosure.
Figure 7:
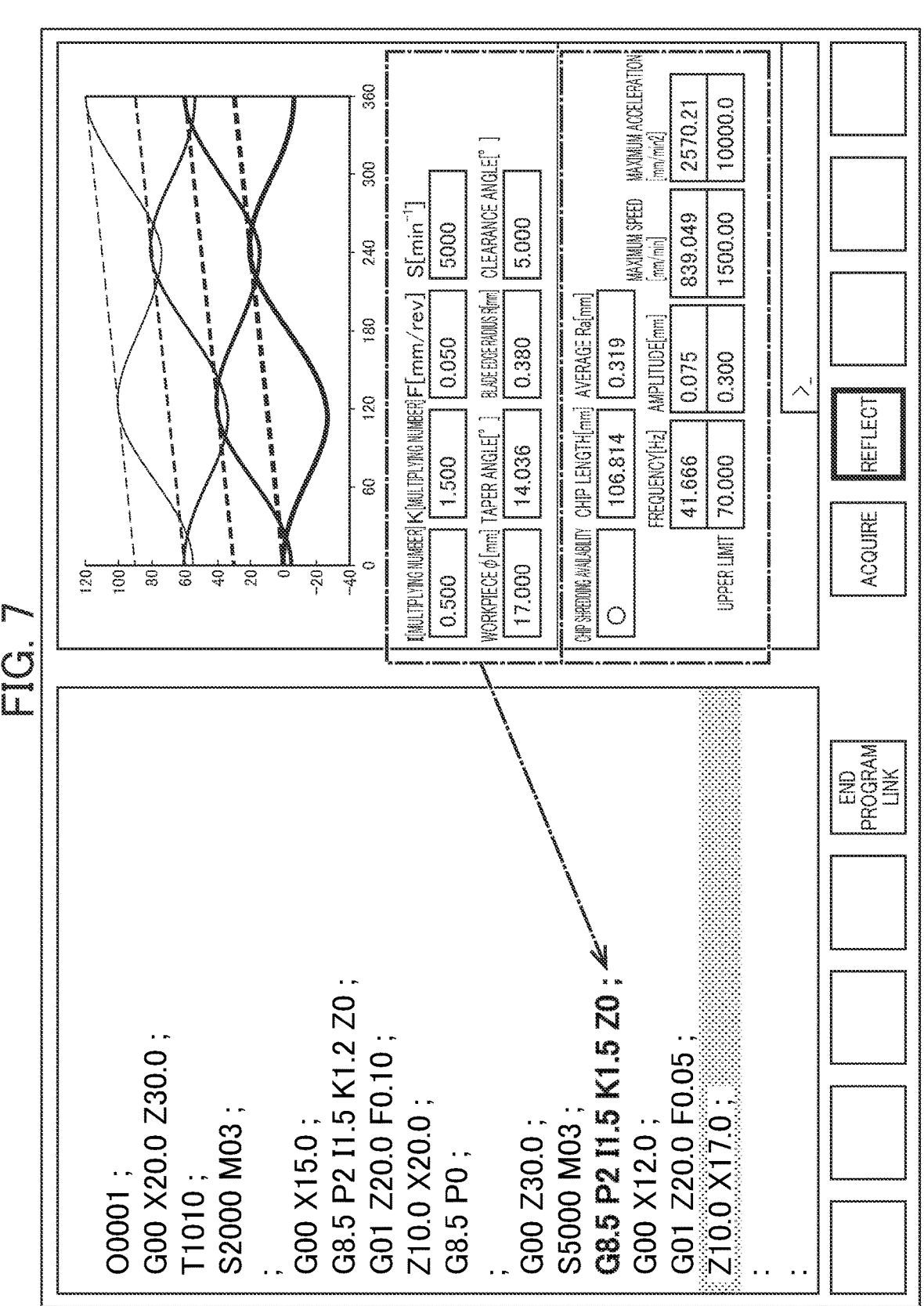
FIG. 7 is a view showing an example where parameters are input on the display unit of the computer of the present disclosure.

Next, a specific technique of the embodiment of the present disclosure will be described with reference to a display form on the display unit as shown in FIGS. 6 and 7. FIG. 6 shows a display example of the display unit 50 in the computer 1 for the machine tool, and the machining program is displayed on the left side. In FIG. 6, The user specifies, using the machining block selection unit 12 (FIG. 3), a row (Z10.0 X17.0;) of the machining program with a dot, and a block (a row of G00 Z30.0; to a row of Z10.0 X17.0;) relating to this row is selected accordingly.

On the right side in FIG. 6, the machining and oscillation conditions for the selected machining program block are displayed. Specifically, on the upper side, a waveform chart showing the path of the cutting tool in the selected machining program block is displayed. In an upper frame on the lower side, the parameters (the oscillation frequency multiplying factor (multiplying number) I, the oscillation amplitude multiplying factor (multiplying number) K, the feeding amount F (mm/rev) per rotation, the rotation number (min⁻¹) about the main axis, the workpiece diameter (mm), the taper angle (°), the blade edge radius R (mm), and the clearance angle (°)) relating to the machining and oscillation conditions for the selected machining program block are displayed. In a lower frame on the lower side, estimated values (the chip shredding availability, the chip length (mm), the average roughness Ra (mm), the frequency (Hz), the amplitude (mm), the maximum speed (mm/min), and the maximum acceleration (mm/min²)) of results of machining according to the selected machining program block are displayed. Moreover, for the frequency (Hz), the amplitude (mm), the maximum speed (mm/min), and the maximum acceleration (mm/min²), the upper limits in machine operation are displayed therebelow.

FIG. 6 shows that the chip shredding availability is determined as unavailable (cross mark) from I and K and the chip length (mm) and the average roughness Ra (mm) are not displayed. Moreover, it shows that the frequency (Hz) =125.000, the maximum speed (mm/min)=1663.72, and the maximum acceleration (mm/min²)=1.8505.5 exceed the upper limits (70.000, 1500.00, and 10000.0 in this order) thereof, and therefore, exceed the upper limits in machine operation.

Next, a method in which the user inputs/sets the machining and oscillation conditions via the input unit 11 (FIG. 3) to reflect these conditions on the machining program will be described with reference to FIG. 7. As shown in a display example of FIG. 7, the user can input the parameters relating to the machining and oscillation conditions as shown in the upper fame on the lower right side. In this example, the oscillation frequency multiplying factor (multiplying number) I is changed to "0.500", the oscillation amplitude multiplying factor (multiplying number) K is changed to "1.50", and these parameter values are inserted into the selected machining program block. In this example, the oscillation frequency multiplying factor (multiplying number) I and the oscillation amplitude multiplying factor (multiplying number) K are changed, and therefore, a command of G8.5 in the selected machining program block is re-edited.

Machining results calculated alter these parameter values have been reflected on the machining program are shown in the lower frame on the lower right side in FIG. 7. The machining results shown in the lower frame on the lower right side are the frequency (Hz)=41.666, the amplitude (mm)=0.075, the maximum speed (ram/min)=839.049, and the maximum acceleration (mm/min²)=2570.21, and any of these values is equal to or less than the upper limit. Thus, the chip shredding availability is determined as available (circle mark). In addition, the chip length (mm)=106.814 and the average roughness Ra (mm)=0.319 can also be displayed.

As seen from FIGS. 6 and 7, the parameters relating to the machining and oscillation conditions can be easily input in the upper frame on the lower right side on the display unit 50 (FIG. 3), the input parameters are promptly inserted into the selected machining program block and are reflected on the machining program, and the calculation results thereof are promptly displayed in the lower frame on the lower right side. Thus, the user can efficiently change the parameters relating to the machining and oscillation conditions to proper values while predicting the machining results by machining program calculation processing.

Next, a method in which the oscillation condition where the values obtained by any one or more units selected from

Figure 8:
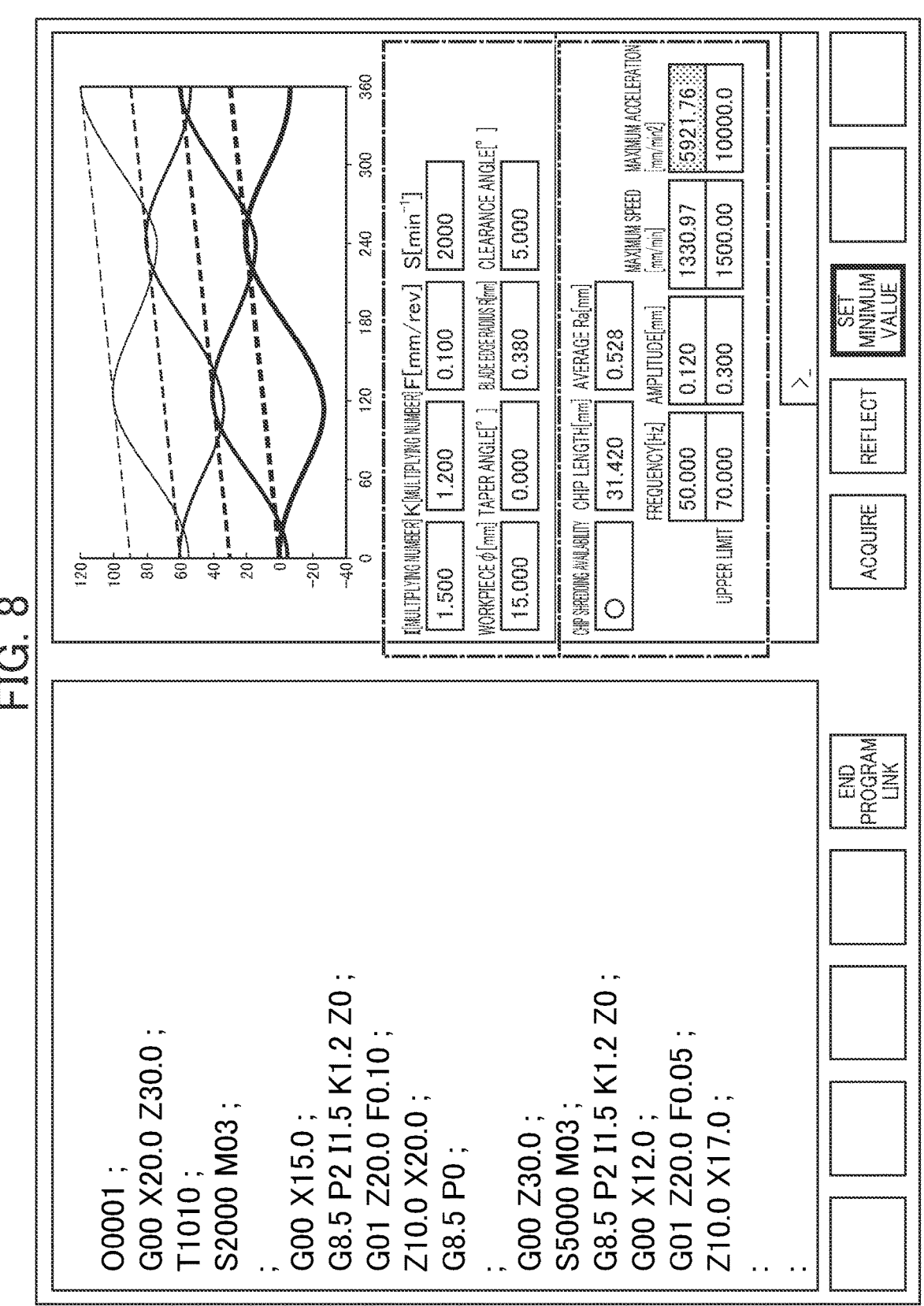
FIG. 8 is a view showing that a parameter to be changed has been selected on the display unit of the computer of the present disclosure.

7 the machining state calculation unit 30 are minimized is obtained by back calculation and is reflected on the machining condition acquisition unit 20 as described above will be described with reference to FIGS. 8 and 9. FIG. 8 shows a state in which the machining and oscillation conditions are input and the value obtained by each unit of the machining state calculation unit is derived. In this state, any of the frequency, the amplitude, the maximum speed, and the maximum acceleration which are the machining results is equal to or less than the upper limit, and therefore, the chip shredding availability is determined as available (circle mark).

Figure 9:
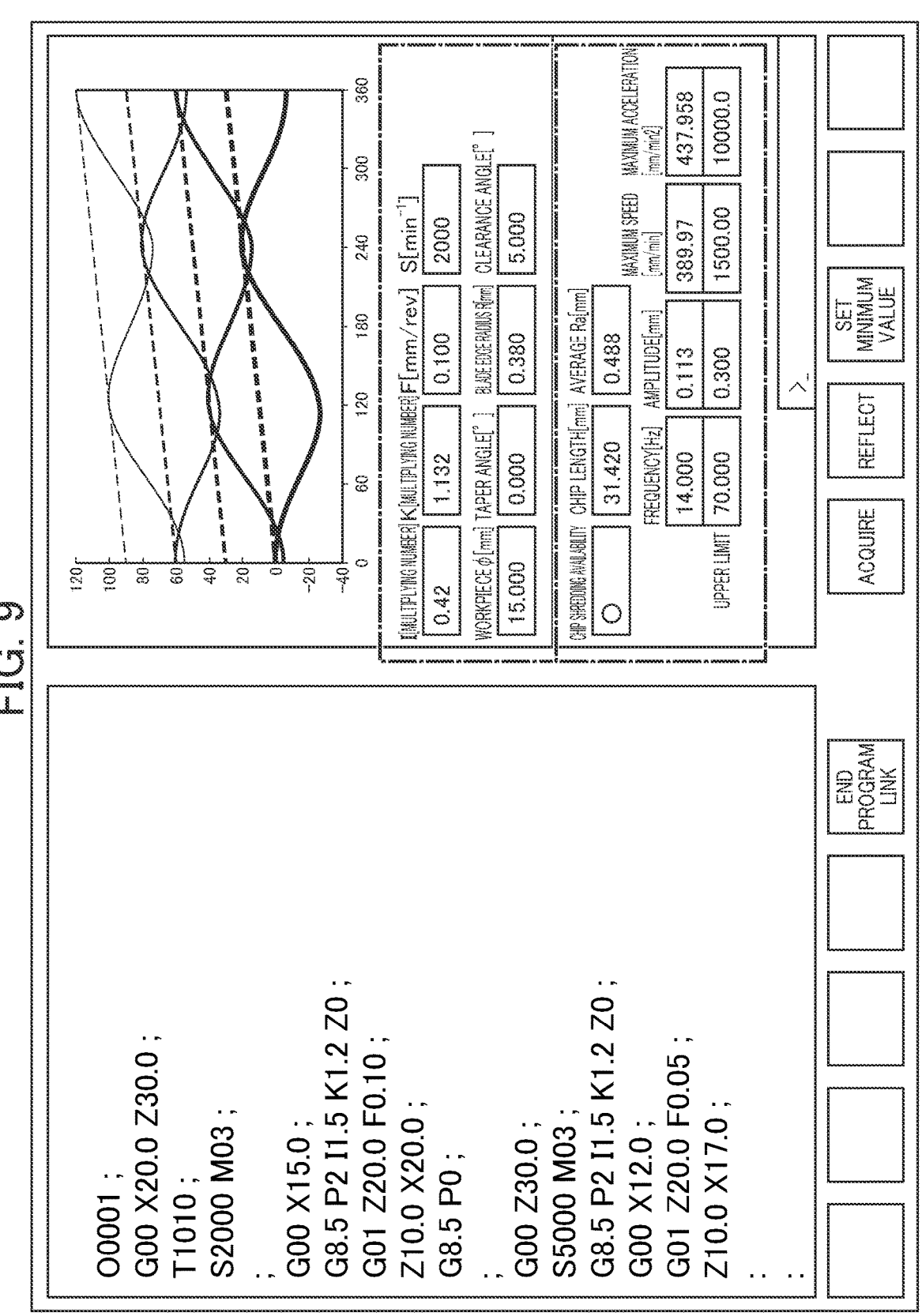
FIG. 9 is a view showing a display example after parameters have been changed on the display unit of the computer of the Present disclosure.
Figure 10:
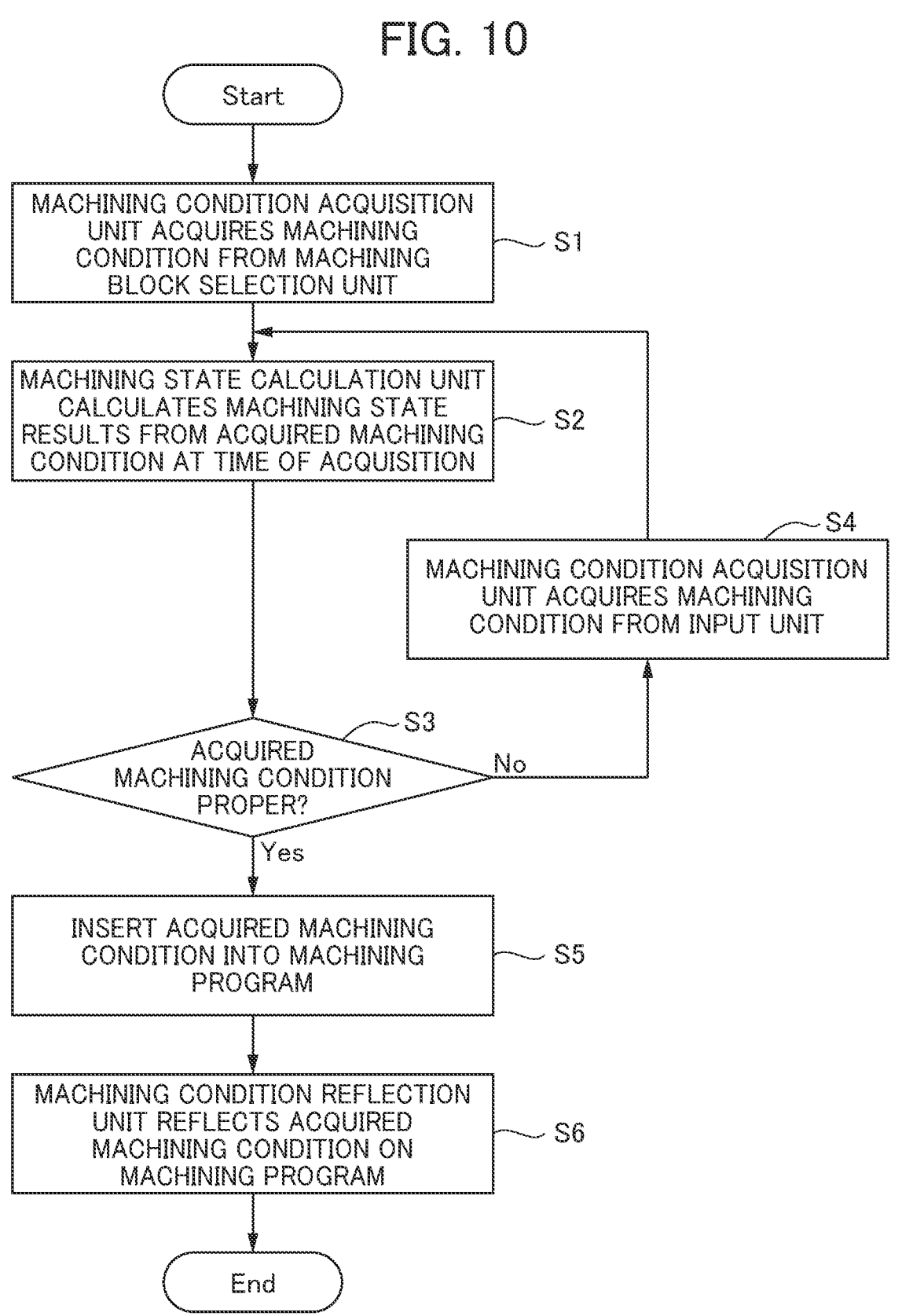
FIG. 10 is a flowchart of one example of the present disclosure.

In a case where the oscillation condition where the values obtained by any one or more units are minimized is obtained by back calculation and is reflected on the machining condition acquisition unit 20, any one or more units are selected from the machining state calculation unit. In this case, the maximum acceleration is selected, and a cursor is placed thereover. Then, a minimum value setting button is clicked, and accordingly, the oscillation condition where the maximum acceleration is minimized is set within a chip shredding available range as shown in FIG. 9. That is, the values of K, I, the frequency, the amplitude, and the maximum speed are changed accompanied by a change in the maximum acceleration. Since the oscillation condition is changed, each machining state value is also updated, and the values of the chip length and the average roughness Ra are updated.

Next, an example of use of the computer for the machine tool according to the present disclosure will be described with reference to a flowchart of FIG. 8. First, the machining condition acquisition unit acquires the machining and oscillation conditions from the machining block selection unit (Step 1). This step is performed in such a manner that the user selects one block from the machining program and selects a row from which results are obtained.

Next, each parameter relating to the machining and oscillation conditions is extracted from the selected block, and is transmitted to the machining state calculation unit. That is, the machining state calculation unit calculates, from the acquired machining and oscillation conditions, state results at the time of such acquisition (Step 2). These results are used subsequently in Step 3.

In Step 3, it is determined, from the state results calculated in Step 2, whether or not the machining and oscillation conditions acquired by the machining condition acquisition unit are proper (Step 3). In a case where the answer of Step 3 is YES, i.e., it is determined that the machining and oscillation conditions are proper, the processing proceeds to Step 5. In a case where the answer of Step 3 is NO, i.e., it is determined that the machining and oscillation conditions are not proper, the processing returns to Step 2 through Step 4.

In Step 4, the machining condition acquisition unit acquires the machining and oscillation conditions from the input unit. This step is performed in such a manner that the user inputs numerical values to input fields for the parameters relating to the machining and oscillation conditions on the display unit. Then, the processing proceeds to Step 2, and the machining state calculation unit calculates, from the acquired machining and oscillation conditions, state results at the time of such acquisition again, and these calculation results are used subsequently in Step 3. Until the answer is determined as YES in Step 3, i.e., until it is determined that the machining and oscillation conditions are proper, a loop of Steps 2, 3, and 4 is repeated.

In Step 5, the acquired machining and oscillation conditions are inserted into the machining program, and the machining program is re-edited (Step 5). Accordingly, the machining condition reflection unit reflects the acquired machining and oscillation conditions on the machining program (Step 6). That is, by this step, the user can obtain a determination result, which indicates whether or not the machining and oscillation conditions are proper, once again, and this flow ends.

As described above, the computer for the machine tool according to the present disclosure has the following significant features and advantageous effects: the parameters relating to the machining and oscillation conditions can be easily input; and the machining program, the parameters relating to the machining and oscillation conditions, and the machining results (state) are displayed on one screen, and therefore, the user can easily select and set the optimal machining and oscillation conditions without repeating the trial-and-error process.

Implementation of the present invention has been described above with reference to the embodiment, but the present invention is not limited to this embodiment. Needless to say, the present invention can be implemented in various aspects without departing from the gist of the present invention.

EXPLANATION OF REFERENCE NUMERALS

1 Computer
11 Input Unit
12 Machining Block Selection Unit
20 Machining Condition Acquisition Unit
30 Machining State Calculation Unit
31 Chip Shredding Determination Unit
32 Chip Length Calculation Unit
33 Surface Roughness Calculation Unit
34 Oscillation Frequency Calculation Unit
35 Oscillation Amplitude Calculation Unit
36 Maximum Speed Calculation Unit
37 Maximum Acceleration Calculation Unit
40 Machining Condition Reflection Unit
50 Display Unit

The invention claimed is:

1. A computer for a machine tool that machines a workpiece while oscillating a cutting tool and the workpiece relative to each other based on a machining program, the computer being configured to:
   acquire a machining condition and an oscillation condition;
   calculate a machining state from the acquired machining and oscillation conditions;
   display, on a display unit, the acquired machining and oscillation conditions and the calculated machining state;
   change the machining state displayed on the display unit to a changed machining state, then back-calculate the machining conditions from the changed machining state, and then change the machining conditions on the display unit to the back-calculated machining conditions; and
   apply the back-calculated machining and oscillation conditions on the machining program.

2. The computer according to claim 1, the computer being configured to:
   receive the machining and oscillation conditions input by a user; and select, from the machining program, a machining block from which the machining and oscillation conditions are acquired, and acquire the received machining and oscillation conditions or acquire the machining and oscillation conditions from the selected machining block.

3. The computer according to claim 2, wherein the selected machining block is a machining block selected by a user from the machining program, or a machining block for which machining conditions and oscillation conditions related to the machining block selected by the user are determined.

4. The computer according to claim 1, wherein to calculate the machining state includes any one or more of the following;

to determine a chip shredding availability;

to calculate a length of a chip of the workpiece;

to calculate a surface roughness of the workpiece;

to calculate an oscillation frequency in relative oscillation of the cutting tool and the workpiece;

to calculate an oscillation amplitude in relative oscillation of the cutting tool and the workpiece;

to calculate a maximum speed in relative oscillation of the cutting tool and the workpiece; and to calculate a maximum acceleration in relative oscillation of the cutting tool and the workpiece.

5. The computer according to claim 4, wherein information including information to obtain an oscillation frequency multiplying factor (multiplying number) I indicating an oscillation frequency, per rotation about a main axis, and information to obtain an oscillation amplitude multiplying factor (multiplying number) K indicating a magnitude of oscillation amplitude with respect to a feeding amount per rotation about the main axis is used to determine the chip shredding availability.

6. The computer according to claim 4, wherein information including information to obtain an oscillation frequency multiplying factor (multiplying number) I indicating an oscillation frequency, per rotation about a main axis, and a workpiece diameter is used to calculate the length of a chip of the workpiece.

7. A computer for a machine tool that machines a workpiece while oscillating a cutting tool and the workpiece relative to each other based on a machining program, the computer being configured to:

acquire a machining condition and an oscillation condition;

calculate a machining state from the acquired machining and oscillation conditions display, on a display unit, the acquired machining and oscillation conditions and the calculated machining state; and apply the acquired machining and oscillation conditions on the machining program;

wherein, to calculate machining state includes any one or more of the following:

to determine a chip shredding availability;

to calculate a length of a chip of the workpiece;

to calculate a surface roughness of the workpiece;

to calculate an oscillation frequency in relative oscillation of the cutting tool and the workpiece;

to calculate an oscillation amplitude in relative oscillation of the cutting tool and the workpiece;

to calculate a maximum speed in relative oscillation of the cutting tool and the workpiece; and to calculate a maximum acceleration in relative oscillation of the cutting tool and the workpiece, wherein information including information to obtain an oscillation frequency multiplying factor (multiplying number) I indicating an oscillation frequency, per rotation about a main axis, information to obtain an oscillation amplitude multiplying factor (multiplying number) K indicating a magnitude of oscillation amplitude with respect to a feeding amount per rotation about the main axis, a tool feeding speed, and a blade edge radius R is used to calculate the surface roughness of the workpiece.

8. The computer according to claim 4, wherein information including information to obtain an oscillation frequency multiplying factor (multiplying number) I indicating an oscillation frequency, per rotation about a main axis, is used to calculate the oscillation frequency.

9. The computer according to claim 4, wherein information including information to obtain an oscillation amplitude multiplying factor (multiplying number) K indicating a magnitude of oscillation amplitude with respect to a feeding amount per rotation about a main axis is used to calculate the oscillation amplitude.

10. The computer according to claim 4, wherein information including information to obtain an oscillation frequency multiplying factor (multiplying number) I indicating an oscillation frequency, per rotation about a main axis, information to obtain an oscillation amplitude multiplying factor (multiplying number) K indicating a magnitude of oscillation amplitude with respect to a feeding amount per rotation about the main axis and a tool feeding speed is used to calculate the maximum speed.

11. The computer according to claim 4, wherein information including information to obtain an oscillation frequency multiplying factor (multiplying number) I indicating an oscillation frequency, per rotation about a main axis, information to obtain an oscillation amplitude multiplying factor (multiplying number) K indicating a magnitude of oscillation amplitude with respect to a feeding amount per rotation about the main axis and a tool feeding speed is used to calculate the maximum acceleration.

12. The computer according to claim 4, wherein information including information to obtain an oscillation frequency multiplying factor (multiplying number) I indicating an oscillation frequency, per rotation about a main axis, information to obtain an oscillation amplitude multiplying factor (multiplying number) K indicating a magnitude of oscillation amplitude with respect to a feeding amount per rotation about the main axis and a tool feeding speed is used in the display unit, and oscillation motion is graphically displayed on the display unit.

13. A non-transitory computer-readable medium storing a computing program causing a computer to execute computation in a machine tool that machines a workpiece while oscillating a cutting tool and the workpiece relative to each other based on a machining program, the computing program causing the computer to execute a machining condition acquisition step of acquiring a machining condition and an oscillation condition;

a machining state calculation step of calculating a machining state from the machining and oscillation conditions acquired in the machining condition acquisition step;

a display step of displaying the machining and oscillation conditions acquired in the machining condition acquisition step and the machining state calculated in the machining state calculation step; and a machining condition reflection step of changing the displayed machining state, back-calculating machining conditions and oscillation conditions from the changed machining state, changing the machining conditions and oscillation conditions on the display unit to the back-calculated machining conditions and oscillation conditions, and applying the back-calculated machining conditions and oscillation conditions to the machining program.

* * * * *